US012123479B2

(12) United States Patent
Mouly et al.

(10) Patent No.: US 12,123,479 B2
(45) Date of Patent: Oct. 22, 2024

(54) PLANET CARRIER FOR A SPEED REDUCER ON AN AIRCRAFT TURBOMACHINE

(71) Applicant: SAFRAN TRANSMISSION SYSTEMS, Colombes (FR)

(72) Inventors: Guillaume Pierre Mouly, Moissy-Cramayel (FR); Guillaume Julien Beck, Moissy-Cramayel (FR); Patrice Julien Ptaszynski, Moissy-Cramayel (FR); Jean-Pierre Serey, Moissy-Cramayel (FR); Adrien Louis Simon, Moissy-Cramayel (FR)

(73) Assignee: Safran Transmission Systems, Colombes (FR)

( * ) Notice: Subject to any disclaimer, the term of this patent is extended or adjusted under 35 U.S.C. 154(b) by 0 days.

(21) Appl. No.: 18/461,740

(22) Filed: Sep. 6, 2023

(65) Prior Publication Data
US 2024/0084876 A1    Mar. 14, 2024

(30) Foreign Application Priority Data

Sep. 9, 2022   (FR) ..................... 2209058

(51) Int. Cl.
*F16H 1/28*    (2006.01)
*F02C 7/36*    (2006.01)

(52) U.S. Cl.
CPC    *F16H 1/28* (2013.01); *F02C 7/36* (2013.01)

(58) Field of Classification Search
CPC ..................... F16H 1/28; F02C 7/36
See application file for complete search history.

(56) References Cited

U.S. PATENT DOCUMENTS

| 5,466,198 A | 11/1995 | McKibbin et al. |
| 7,011,599 B2* | 3/2006 | Becquerelle .......... F16H 57/082 403/224 |
| 7,316,629 B2* | 1/2008 | Nakagawa ............ F16H 57/082 475/331 |
| 8,667,688 B2* | 3/2014 | McCune ............... F16H 57/023 475/159 |

FOREIGN PATENT DOCUMENTS

| DE | 20 2018 102 232 U1 | 8/2019 |
| EP | 4 108 899 A1 | 12/2022 |
| EP | 4 108 900 A1 | 12/2022 |

OTHER PUBLICATIONS

French Search Report mailed Mar. 27, 2023 issued in corresponding French Application No. FR2209058, filed Sep. 9, 2022, 8 pages total.

* cited by examiner

*Primary Examiner* — Derek D Knight
(74) *Attorney, Agent, or Firm* — Christensen O'Connor Johnson Kindness PLLC

(57) ABSTRACT

A planet carrier for a speed reducer of an aircraft turbomachine, the planet carrier including a cage carrier and a cage. The cage can have two parts: a first part having a wall and bridges, these bridges projecting axially from a face of this wall and including first axial ends connected to this face and second free axial ends; and a second part having another of the walls, this other wall including a face to which the free ends of the bridges are applied. The two parts of the cage can be attached together by screws.

16 Claims, 9 Drawing Sheets

PLANET CARRIER FOR A SPEED REDUCER ON AN AIRCRAFT TURBOMACHINE

CROSS-REFERENCE(S) TO RELATED APPLICATION(S)

This application claims priority to FR2209058, filed Sep. 9, 2022, which is incorporated by reference herein in its entirety.

BACKGROUND

The role of a mechanical reducer is to modify the speed ratio and the torque between an input shaft and an output shaft of the drive mechanism via a transmission mechanism.

The new generations of double-flow turbomachines, in particular those with a high bypass ratio, comprise a mechanical reducer to drive the shaft of a fan. The usual purpose of the reducer is to convert the rotational speed referred to as high speed of the shaft of a power turbine into a slower rotational speed for the shaft driving the fan.

Such a reducer comprises a central pinion, referred to as sun gear, a ring gear and pinions referred to as planet gears, which are engaged between the sun gear and the ring gear. The planet gears are maintained by a frame referred to as planet carrier. The sun gear, the ring gear and the planet carrier are planetary because their axes of revolution coincide with the longitudinal axis of the turbomachine. The planet gears each have a different axis of revolution and are equally distributed on the same operating diameter around the axis of the planetaries. These axes are parallel to the longitudinal axis of the turbomachine.

There are several reducer architectures. In the prior art of the double-flow turbomachines, the reducers are of the planetary or epicyclic type. In other similar applications, there are architectures referred to as differential or "compound."
- on a planetary reducer, the planet carrier is stationary and the ring gear is the output shaft of the device which rotates in the opposite direction of the sun gear.
- in an epicyclic reducer, the ring gear is stationary and the planet carrier is the output shaft of the device which rotates in the same direction as the sun gear.
- on a compound reducer, no element is attached in rotation. The ring gear rotates in the opposite direction of the sun gear and of the planet carrier.

The reducers can consist of one or more gear stages. This meshing is ensured in different ways such as by contact, friction or by magnetic field. There are several types of meshing by contact such as straight or herringbone toothings.

The planet carrier may be a one-piece or may be in the form of a cage and a cage carrier. The principle of this second type of planet carrier with cage and cage carrier is to keep the cage in its plane of symmetry in order to balance the recovery of forces on either side of each planet gear.

The cage comprises an internal cavity in which the sun gear, the planet gears and the guide bearings for guiding these planet gears are housed. The sun gear comprises internal splines for coupling to a first shaft of the turbomachine and the cage carrier comprises a tubular segment comprising external splines for coupling to another shaft.

The connection of the cage to the cage carrier is usually rigid. Alternatively, a technology can be envisaged in which the cage is connected to the cage carrier by "flexible" connections, as described in the document FR-A1-2 853 382. In such a case, the cage carrier comprises an annular row of axial fingers that carry first connection elements. These first connection elements cooperate with second connection elements mounted in housings in the cage to form flexible connections between the cage carrier and the cage, which allow at least one or two degrees of freedom.

It has already been proposed that these flexible connections can be made using ball-and-socket joints, with the fingers carrying ball-and-socket joints through which cylindrical spindles extend into the housings of the cage.

Sometimes it is not possible to mount the planet gears into the cage from either inside or outside of the cage, so the cage has to be cut into several parts to mount the planet gears before the parts of the cage are reassembled.

Under load, the parts of the cage each recover a portion of the load. The way the parts of the cage are assembled must allow this load to be transmitted to the connections with the cage carrier, and also ensure that the cage can withstand this load. In addition, the guide bearings guiding the planet gears are supported by the cage and must be perfectly positioned once the parts have been assembled to ensure that the reducer operates correctly.

The prior art also comprises the documents U.S. Pat. No. 5,466,198 and DE-U1-20 2018 102232. In the document U.S. Pat. No. 5,466,198, the planet carrier comprises a cage whose walls are connected by bridges. The cage comprises two parts comprising each a wall and a half of the bridges. The connecting plane of these parts is a median plane of the cage and of the planet carrier, i.e. a plane that is located in the middle of the cage and passes through the middle of the planet gears and of the sun gear.

The present disclosure proposes an improvement that provides a simple, effective, and economical solution to at least some of the above problems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The disclosure relates to a planet carrier for a speed reducer of an aircraft turbomachine, this planet carrier can include: a cage carrier with a main axis and having a coupling segment centered on this axis and which has axial cage support fingers distributed around the axis; and a cage centered on the axis and having two radial annular walls connected to each other by bridges distributed around the axis, the bridges being situated at the external periphery of the walls and defining with the walls an internal cavity of the cage, the bridges having or defining axial housings in which the fingers are mounted, the fingers being connected to the bridges by connections allowing at least one degree of freedom, one of the walls having axially through openings which are axially aligned with axially through openings in the other of the walls. In some embodiments, the cage includes two parts: a first part having one of the walls and the bridges, these bridges projecting axially from one face of this wall and having first axial ends connected to this face and second free axial ends; and a second part having the other of the walls, this wall having a face to which the free ends of the bridges are applied, and in that the two parts of the cage are attached together by attachment means which pass through the wall of the second part and are inserted in attachment holes in the bridges.

The parts of the cage of the planet carrier can therefore be attached by clamping the bridges of one of the parts directly to the other part, insofar as the second part can be considered as forming or comprising a flange for attaching to the bridges of the first part. This attachment allows the loads to be transmitted during operation. In some embodiments, the means of attaching the parts of the cage are dimensioned to withstand this load transmission.

The mounting openings for mounting the bearings of the planet gears are axially aligned with precision, and the way the parts of the cage are attached allows to ensure this correct positioning and therefore the smooth operation of the reducer.

The fact that the bridges are carried by one of the walls and not divided into two halves carried respectively by the two walls is expected to provide several advantages, including: (1) each of the bridges is formed from a single piece and a single block, guaranteeing its integrity and its mechanical strength during operation; (2) the plane of connection of the portions of the cage and therefore the plane of transmission of the forces between these portions is offset to one side of the cage, which is less likely to penalize the operation of the reducer and in some embodiments to alter the meshing of the planet gears during operation; and (3) the attachment holes formed in the bridges can be tapped to receive the attachment means by screws directly (without the need for nuts), which was not possible with the prior technique because the bridge halves are not necessarily long enough for their attachment holes to be tapped.

Embodiments of the present disclosure are compatible with: (1) a single stage or multi-stage reducer; (2) a planetary, epicyclic or differential reducer; (3) straight, helical or herringbone toothings; and (4) all types of planet gear bearings, including rolling elements, hydrodynamic bearings, etc.

The planet carrier according to the disclosure may comprise one or more of the following characteristics, taken alone from each other, or in combination with each other: (1) at least one of the parts of the cage comprises centering members configured to cooperate with the other of the parts, in order to ensure a centering of the parts relative to each other and on the axis; (2) the centering members comprise curved edges which are carried by one of the parts and which extend around the axis, these curved edges being configured to cooperate with curved surfaces of the other of the parts; (3) the curved edges are protuberances which project axially; (4) the first part comprises centring members which are located on the free ends of the bridges, at their radially internal and/or external ends; (5) the second part comprises centring members which are located on the face of its wall; (6) the free end of each of the bridges comprises a face bearing on the aforementioned face of the wall of the second part, the housing of each bridge opening onto this bearing face, and the orifices for attaching the bridges being distributed around the opening of this housing; (7) the wall of the second part comprises axial holes which pass through the wall and are aligned with the housings of the bridges, the wall of the second part comprising axial orifices which are passed through by the attachment means and which are distributed around these holes; (8) the first part is located on the side of the tubular segment of the cage carrier; (9) the curved edges are configured to engage by axial sliding with the curved surfaces during the mounting of the cage; (10) the curved edges are configured to cooperate by radial abutment with the curved surfaces in operation; (11) each of the bridges is hollowed out to form one of the housings; (12) the bridges are distributed in pairs and the two bridges of each pair are radially aligned and define between them one of the housings; (13) the segment is tubular; and (14) the attachment means are screws and the attachment holes are tapped to receive the screws by screwing.

The disclosure also relates to a speed reducer for an aircraft turbomachine, this reducer having a main axis and including: a planet carrier as described above; a sun gear which extends into the internal cavity of the cage and is centered on the axis; planet gears arranged in the internal cavity around the axis and the sun gear and meshed with the sun gear, these planet gears being centered and guided by bearings, the axial ends of which are mounted in the aforementioned openings in the walls; and a ring gear arranged around the axis and the cage and meshed with the planet gears.

The disclosure further relates to a turbomachine for an aircraft, including a reducer as described above.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

Figure 1:
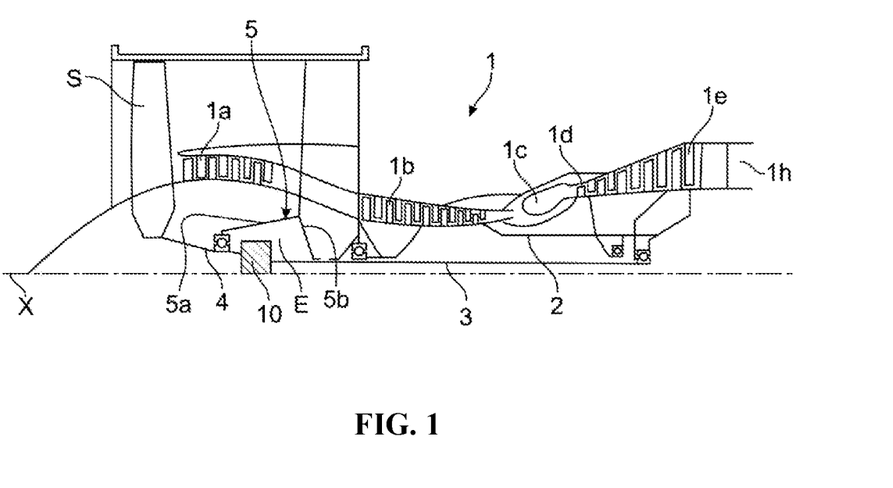
FIG. 1 is a schematic axial cross-sectional view of a turbomachine in accordance with embodiments of the present disclosure.

FIG. 1 describes a turbomachine 1 which conventionally comprises a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and together they form a high-pressure (HP) body. The low-pressure compressor 1a and the low-pressure turbine 1e are connected by a low-pressure shaft 3 and together they form a low-pressure (LP) body.

The fan S is driven by a fan shaft 4 which is connected to the LP shaft 3 by means of a reducer 10. This reducer is usually of the planetary or epicyclic type.

Although the following description concerns a reducer with planetary or epicyclic type, it also applies to a mechanical differential in which its three essential components, that are the planet carrier, the ring gear and the sun gear, can be rotatable, the rotational speed of one of these components depending on the difference in speed of the other two components.

The reducer 10 is positioned in the upstream portion of the turbomachine. A stationary structure comprising schematically, here, an upstream portion 5a and a downstream portion 5b which makes up the engine casing or stator 5 is arranged so as to form an enclosure E surrounding the reducer 10. This enclosure E is here closed upstream by seals at the level of a bearing allowing the passage of the fan shaft 4, and downstream by seals at the level of the passage of the LP shaft 3.

Figure 2:
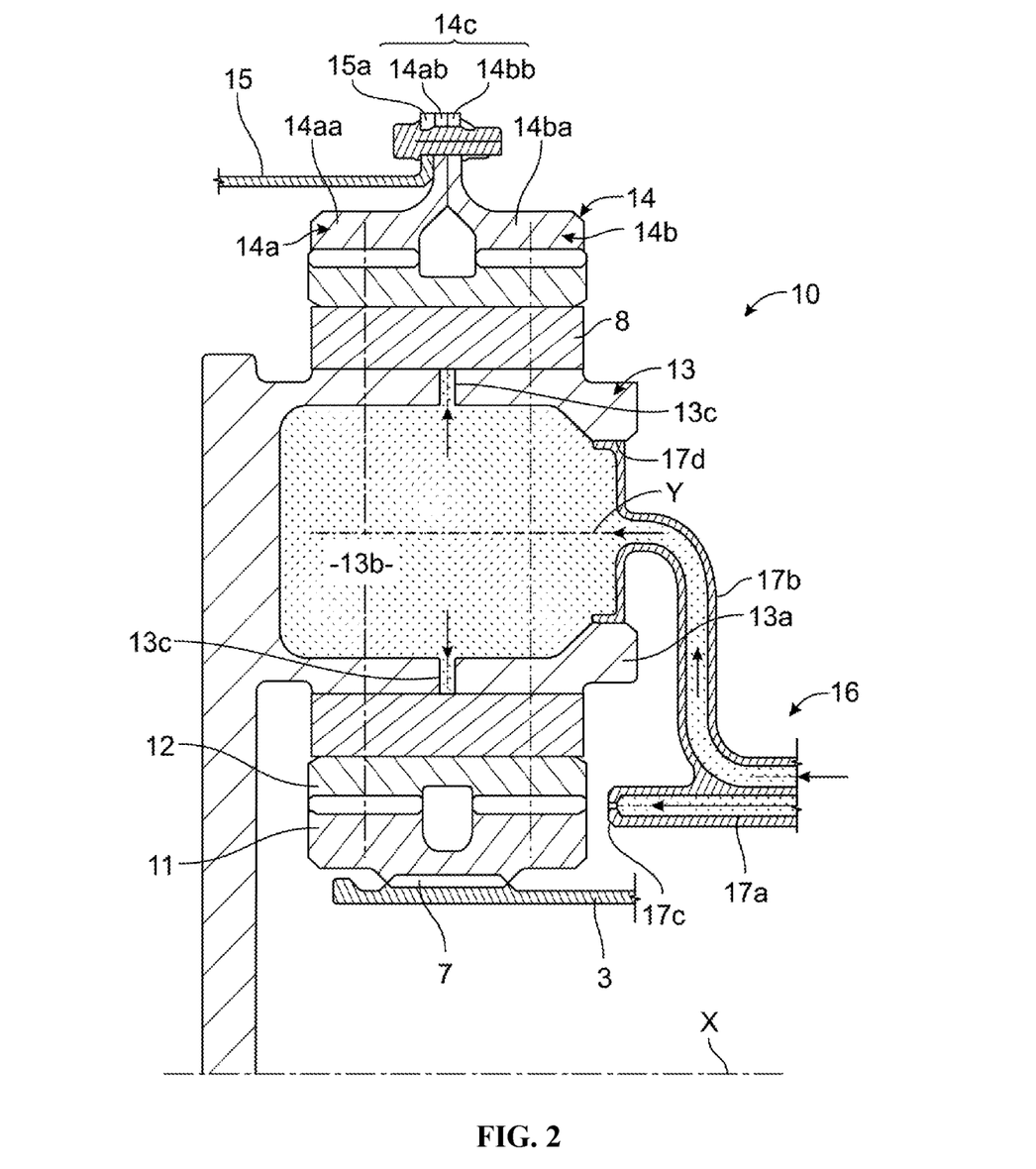
FIG. 2 is a schematic view of a reducer with epicyclic gear train in axial cross-section in accordance with embodiments of the present disclosure.

FIG. 2 shows a portion of a reducer 10 that can take the form of different architectures depending on whether certain parts are stationary or in rotation. The input of the reducer 10 is connected to the LP shaft 3, for example by means of splines 7. Thus, the LP shaft 3 drives a planetary pinion referred to as the sun gear 11. Classically, the sun gear 11, whose axis of rotation is coincident with the axis X of the turbomachine 1, drives a series of pinions referred to as planet gears 12, which are equally spaced on the same diameter around the axis of rotation X. This diameter is equal to twice the operating centre distance between sun gear 11 and planet gears 12. The number of planet gears 12 is generally defined between three and seven for this type of application.

The assembly of the planet gears 12 is maintained by a frame referred to herein as a planet carrier 13. Each planet gear 12 rotates around its own axis Y and meshes with the ring gear 14.

At the output of the reducer 10, the embodiments include:
in an epicyclic configuration, the assembly of the planet gears 12 drives the planet carrier 13 in rotation around the axis X of the turbomachine. The ring gear 14 is attached to the engine casing or stator 5 via a ring gear carrier 15 and the planet carrier 13 is attached to the fan shaft 4.
in a planetary configuration, the assembly of the planet gears 12 is maintained by a planet carrier 13 which is attached to the engine casing or stator 5. Each planet gear 12 drives the ring gear 14, which is connected to the fan shaft 4 via a ring gear carrier 15.

Each planet gear 12 is mounted so that it can rotate freely by means of a bearing 8, for example of the rolling or hydrodynamic type. Each bearing 8 is mounted on one of the axles 13a of the planet carrier 13, and all of the axles are positioned relative to each other using one or more structural frame of the planet carrier 13. The number of axles and bearings is equal to the number of planet gears 12.

In the example shown in FIG. 2, the ring gear 14 is divided into two half-ring gears and comprises:
a front half-ring gear 14a comprising a rim 14aa and an attachment half-flange 14ab. On the rim 14aa is the front propeller of the toothing of the reducer. This front propeller meshes with that of the planet gear 12 which meshes with that of the sun gear 11.
a rear half-ring gear 14b comprises a rim 14ba and an attachment half-flange 14bb. On the rim 14ba is the rear propeller of the toothing of the reducer. This rear propeller meshes with that of the planet gear 12 which meshes with that of the sun gear 11.

The attachment half-flange 14ab of the front ring gear 14a and the attachment half-flange 14bb of the rear ring gear 14b form the attachment flange 14c of the ring gear. The ring gear 14 is attached to the ring gear carrier 15 by assembling the attachment flange 14c of the ring gear and the attachment flange 15a of the ring gear carrier using a bolted mounting, for example.

The arrows in FIG. 2 describe the oil conveying in the reducer 10. The oil arrives in the reducer 10 from the stator portion 5 in the dispenser 16 by different means which will not be specified in this view because they are specific to one or several types of architecture. The dispenser 16 is separated into two portions, each of which is repeated by the same number of planet gears. The function of the injectors 17a is to lubricate the toothings, and the function of the arms 17b is to lubricate the bearings 8. The oil is fed towards the injector 17a to emerge through the end 17c to lubricate the toothings. The oil is also fed towards each arm 17b and circulates through the feed mouth 17d of the bearing 8. The oil then circulates through the axle 13a into one or more buffer areas 13b and then emerges through orifices 13c to lubricate the bearings 8 of the planet gears.

Figure 3:
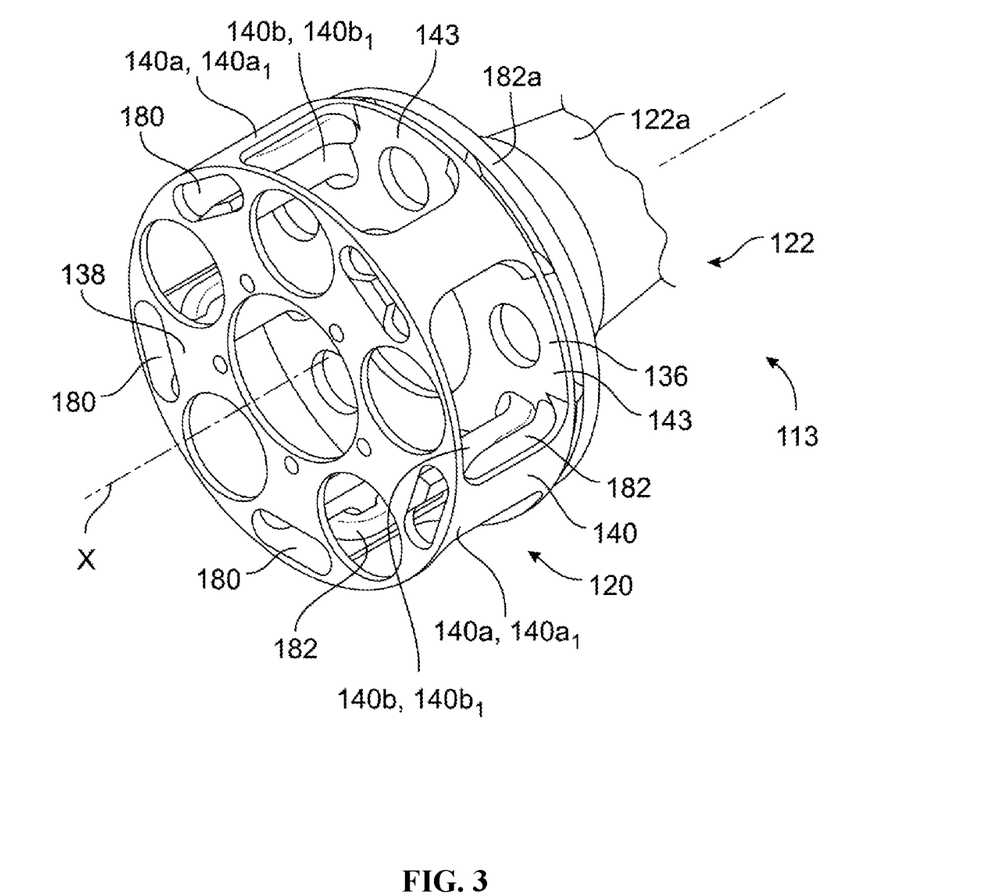
FIG. 3 is a schematic perspective view of a cage of a reducer planet carrier in accordance with embodiments of the present disclosure.
Figure 4:
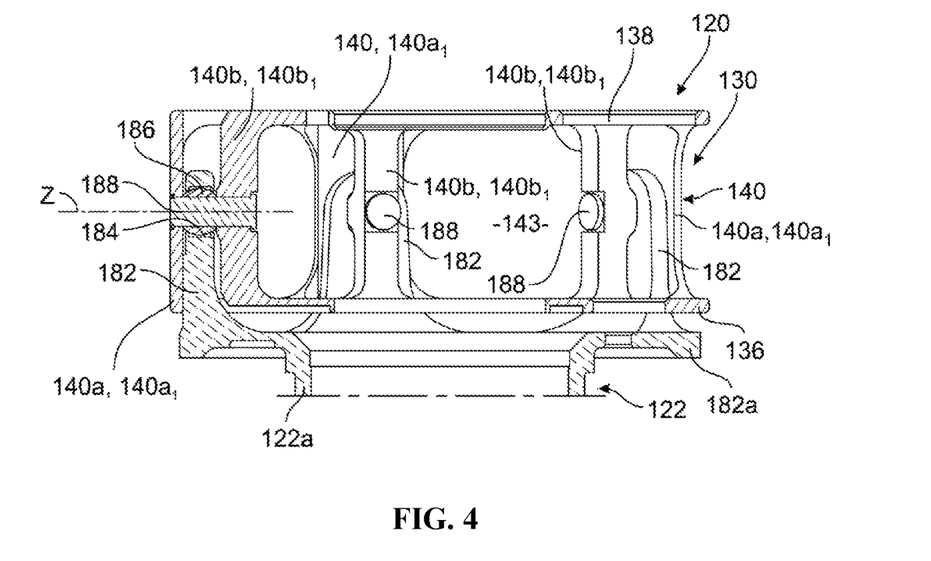
FIG. 4 is a schematic axial sectional view of a planet carrier cage and cage carrier in accordance with embodiments of the present disclosure.
Figure 5:
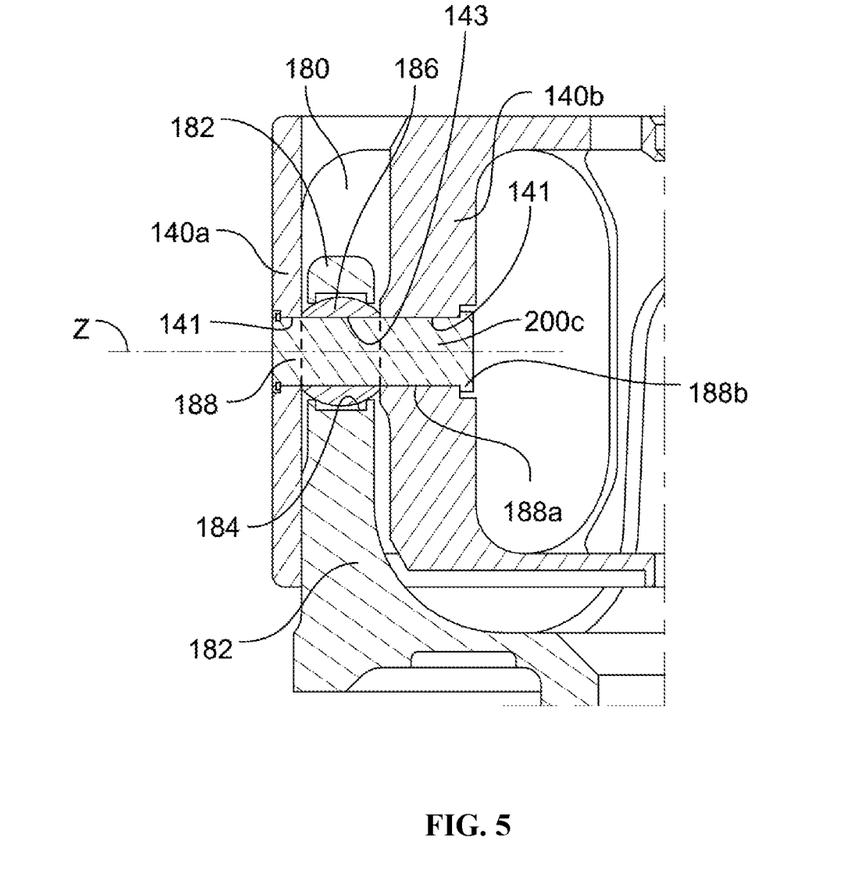
FIG. 5 is a detail view of a portion of the schematic axial sectional view in FIG. 4.

In FIGS. 3-5, elements already described above are designated by the same references increased by one hundred (in the 100-series).

FIGS. 3-5 show an embodiment of a planet carrier 113, this planet carrier comprising a cage 120 and a cage carrier 122 connected by flexible links, in this case ball-and-socket joints.

The cage 120 comprises two radial annular walls 136, 138 that are parallel to each other and perpendicular to the axis X, and a cylindrical wall 140 that extends between the external peripheries of these walls 136, 138.

In the illustrated embodiments, the cylindrical wall 140 is of the double-skinned type and comprises an external skin 140a interrupted by slits 143 and an internal skin 140b interrupted by the same slits 143. In the example shown, which is not limiting, the external skin 140a separated by five slits 143 forms five outer or external bridges 140a1, and the internal skin 140b separated by five slits 143 forms five inner or internal bridges 140b1. Each pair or couple of internal and external bridges 140a1, 140b1 form a clevis to accommodate one of the fingers 182 of the cage carrier 122. In other words, the bridges 140a1, 140b1 of each couple define between them a housing 180 for receiving a finger 182 of the cage carrier 122. The bridges 140a1, 140b1 of each pair are radially aligned and define this housing between them.

In other embodiments, the cylindrical wall 140 can be single-skinned and each of the bridges 140a1, 140b1 can be hollowed out to form one of the housings 180.

The bridges 140a1, 140b1 provide the structural connection between the walls 136 and 138. The housings 180 open onto the walls 136 and 138, the fingers 182 being engaged in the housings 180 through the openings in the wall 136 in the example shown.

The cage 120 can have an annular row of housings 180. These housings 180 receive the axial fingers 182 secured to a substantially radial annular wall 182a of the cage carrier 122. The wall 182*a* is located at an axial end of the cage carrier 122. The cage carrier 122 has a tubular segment 122*a* which comprises means for coupling to a shaft, for example to the fan shaft 4. These coupling means, which are not shown, are external splines for example.

The fingers 182 can extend axially from the wall 182*a* and are engaged by axial translation into the housings 180. Each finger 182 comprises, substantially at its middle, a ring 184 for mounting the ball joint 186 designed to be passed through by a cylindrical spindle 188 carried by the cage 120.

The ring 184 has a substantially radial orientation with respect to the axis X. It can be generally cylindrical in shape. The cage 120 and the ball joint 186 have a thickness, measured in a radial direction with respect to the axis X, which is less than the inter-bridges distance or the radial thickness of the oblong slit 180, so that they can be engaged in this housing concomitantly with the finger 182 supporting these parts.

Each housing 180 is passed through by a spindle 188 which has a substantially radial orientation with respect to the axis X. Each spindle 188 includes a cylindrical body 188*a* connected at an axial end, here radially internal, to an external annular collar 188*b*. The spindle 188 is here engaged by radial translation from the inside through radial orifices 141, 143 of the bridges 140*a*1, 140*b*1 and of the ball joint 186, its collar 188*b* being intended to come to bear radially on the outer bridge 140*a*1 of the cage 120 in the example shown. After the spindle 188 has been inserted into the orifices of the bridges until the collar 188*b* rests on the outer bridge 140*a*1, the collar 188*b* is attached to this bridge, for example by screwing.

The walls 136, 138 define between them and with the bridges 140*a*1, 140*b*1 an internal cavity of the cage which is configured to receive the sun gear and the planet gears of the reducer.

At the level of their centres, the walls 136, 138 comprise openings 190 aligned on the axis for mounting the sun gear. Around this opening 190, each of the walls 136, 138 comprises openings 192 for mounting the ends of the guide bearings for guiding the planet gears, which are inserted into the cavity through the slits 143.

In some embodiments, it is not always possible to mount the sun gear and the planet gears in a monobloc cage of planet carrier as shown in FIGS. 3-5, and an alternate embodiment of the present disclosure provides a solution to this problem with a planet carrier cage that is formed by assembling two parts.

In the following description, the elements already described above are designated by the same references increased by another hundred (in the 200-series).

Figure 6:
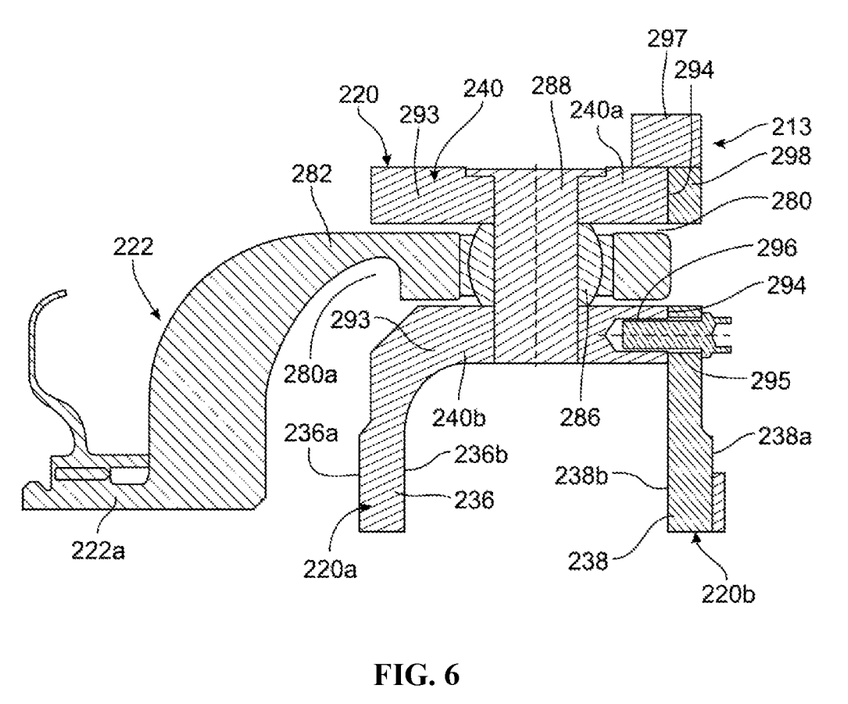
FIG. 6 is a partial schematic view similar to FIG. 5 and illustrating a first embodiment of a planet carrier in accordance with embodiments of the present disclosure.
Figure 7:
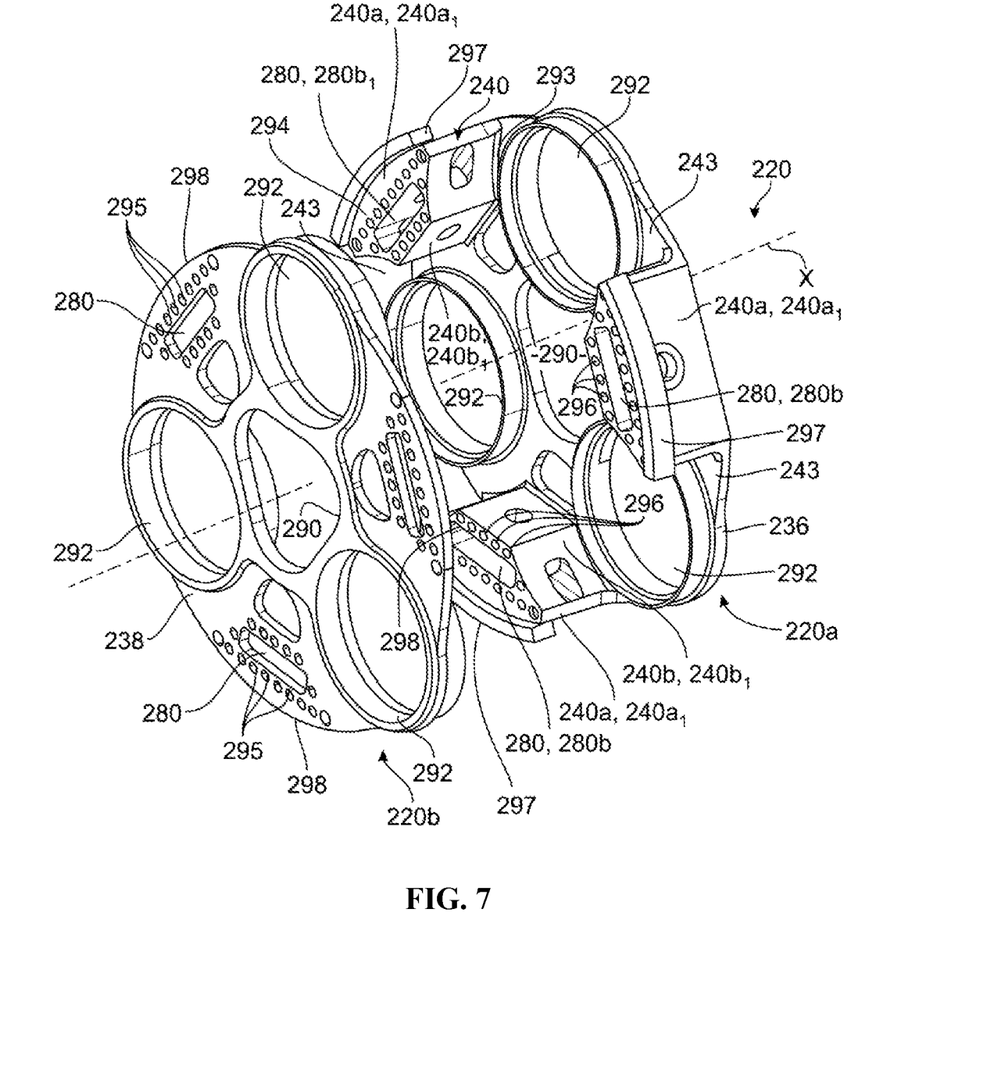
FIG. 7 is a schematic exploded perspective view of the planet carrier of FIG. 6.

FIGS. 6 and 7 show an embodiment of a cage 220 and its parts 220*a*, 220*b* for a planet carrier 213 according to embodiments of the present disclosure. FIG. 6 shows part of this planet carrier 213, which forms part of a speed reducer for an aircraft turbomachine.

The preceding description of the turbomachine 1, the reducer 10 and the planet carrier 113 apply to the planet carrier 213 and to the reducer of the present disclosure.

The planet carrier 213 has a cage 220 and a cage carrier 222 connected by connections which allow at least one or two degrees of freedom and which are, for example, ball-and-socket connections, as mentioned above.

The cage carrier 222 is similar to the cage carrier 112 described above and differs, for example, in the number of its fingers 282, which is three in the case of the cage carrier 222, compared with five in the case of the cage carrier 122.

In other embodiments, the number of fingers can be two, four, six, seven, etc., and are within the scope of the present disclosure.

The connections with spindles 288 and ball joints 286 can be similar to those described above.

The cage carrier 222 comprises a tubular segment 222*a* which comprises means for coupling to a shaft, for example to the fan shaft 4. These coupling means, which are not shown, are external splines for example.

The cage 220 comprises two radial annular walls 236, 238 that are parallel to each other and perpendicular to the axis X, and a cylindrical wall 240 that extends between the external peripheries of these walls 236, 238.

The cylindrical wall 240 is double-skinned and comprises an external skin 240*a* interrupted by slits 243 and an internal skin 240*b* interrupted by the same slits 243. In the example shown, which is not limiting, the external skin 240*a* separated by three slits 243 forms three outer or external bridges 240*a*1, and the internal skin 240*b* separated by three slits 243 forms three inner or internal bridges 240*b*1. Each pair or couple of internal and external bridges 240*a*1, 240*b*1 form a clevis to accommodate one of the fingers 282 of the cage carrier 222. In other words, the bridges 240*a*1, 240*b*1 of each pair define between them a housing 280 for receiving a finger 282 of the cage carrier 222.

Alternatively, as mentioned above, the cylindrical wall 240 could be of the single-skin type and the housings 280 would then be hollowed out or formed in the bridges.

The bridges ensure the structural connection between the walls 236 and 238. Elongated or oblong slits are formed in or between the bridges 240*a*1, 240*b*1 to receive the fingers 282.

The wall 236 located on the side of the cage carrier 222 comprises an external lateral face 236*a* and an internal lateral face 236*b* which faces the other wall 238. This other wall 238 comprises an internal lateral face 238*b* facing the wall 236, and an external lateral face 238*a*. The housings 280 pass axially through the cage 220 and open onto the faces 236*a*, 238*a*.

The walls 236, 238 comprise axially through openings 290 which can be axially aligned with each other and with the axis X.

The walls 236, 238 comprise axially through openings 292 which are axially aligned with axially through openings 292 of the other of the walls. These openings 292 can be distributed around the axis X and are designed to receive the axial ends of the bearings (not shown) for guiding the planet gears of the reducer, which may be plain bearings or rolling bearings for example.

As shown in FIGS. 6 and 7, the cage 220 can include a first part 220*a* and a second part 220*b*, which are clamped together.

The first part 220*a* comprises the wall 236 and the bridges 240*a*1, 240*b*1, and in some embodiments all the bridges. These bridges 240*a*1, 240*b*1 project axially from the face 236*b* of the wall 236 and comprise first axial ends 293 connected to this face and second free axial ends 294.

The second part 220*b* comprises the wall 238, the face 238*b* of which is applied axially to the free ends 294 of the bridges 240*a*1, 240*b*1.

The free ends 294 of the bridges 240*a*1, 240*b*1 each comprise a radial face into which the housings 280 open. These faces of the bridges 240*a*1, 240*b*1 thus comprise openings 280*b* for the housings 280. These housings 280 are partly formed in the wall 236, which for this purpose comprise through openings 280*a* aligned with the openings of the housings 280. The shapes and transverse dimensions of the openings 280*a* are therefore similar to those of the housings 280.

The attachment means are screws 299 which can be seen in FIG. 6. The screws are mounted through orifices 295 in the wall 238, on the side on the face 238*a*, and are screwed into tapped holes 296 in the free ends 294 of the bridges 240*a*1, 240*b*1.

As can be seen in the FIGURES, the orifices 295 are distributed around the openings 280*b*. Their number is between 5 and 30 per pair of bridges 240*a*1, 240*b*1 and in some embodiments between 10 and 20 per bridge. A portion of the orifices 295 is located radially outside the openings 280*b* and another portion of the orifices 295 is located radially inside these openings 280*b*.

In the same way, the tapped holes 296 are distributed around the openings 280*a* formed in the wall a. Their number is equal to the number of orifices 295.

It can also be seen that the connecting plane of the parts 220*a*, 220*b* is offset from the median plane of the cage 220, which passes at the level of the axles of the spindles 288.

In some embodiments, the tapped holes 296 extend from the free ends 294 of the bridges to before this median plane, as can be seen in FIG. 6.

During the mounting of the cage 220, the parts 220*a*, 220*b* are brought axially together until they rest on each other. The orifices 295 in the part 220*b* must be aligned with the tapped orifices 294 in the part 220*a*. To ensure a precise centring of the parts 220*a*, 220*b* relative to each other, at least one of the parts may comprise centring members configured to cooperate with the other of the parts.

In some embodiments, the centring members comprise curved edges 297 which are carried by one of the parts and which extend around the axis X, these curved edges 297 being configured to cooperate with curved surfaces 298 of the other of the parts.

In the example shown in FIGS. 6 and 7, the curved edges 297 are carried by the part 220*a* and are protuberances which extend axially projecting from the free ends 294 of the bridges 240*a*1, 240*b*1, and in some embodiments at the level of the radially external ends of the external bridges 240*a*1.

Each of the external bridges 240*b*1 thus comprises a projecting curved edge 297 oriented axially towards the other part 220*b*. Each of these edges 297 is designed to cooperate by axial sliding with a complementary surface 298 of the part 220*b* and of its wall 238.

In the example shown, each of the edges 297 has an angular extent around the axis X of between 20 and 70°, and preferably between 30 and 50°. Each of the surfaces 298 has an angular extent around the axis X of between 20 and 70°, and preferably between 30 and 50°.

Figure 8:
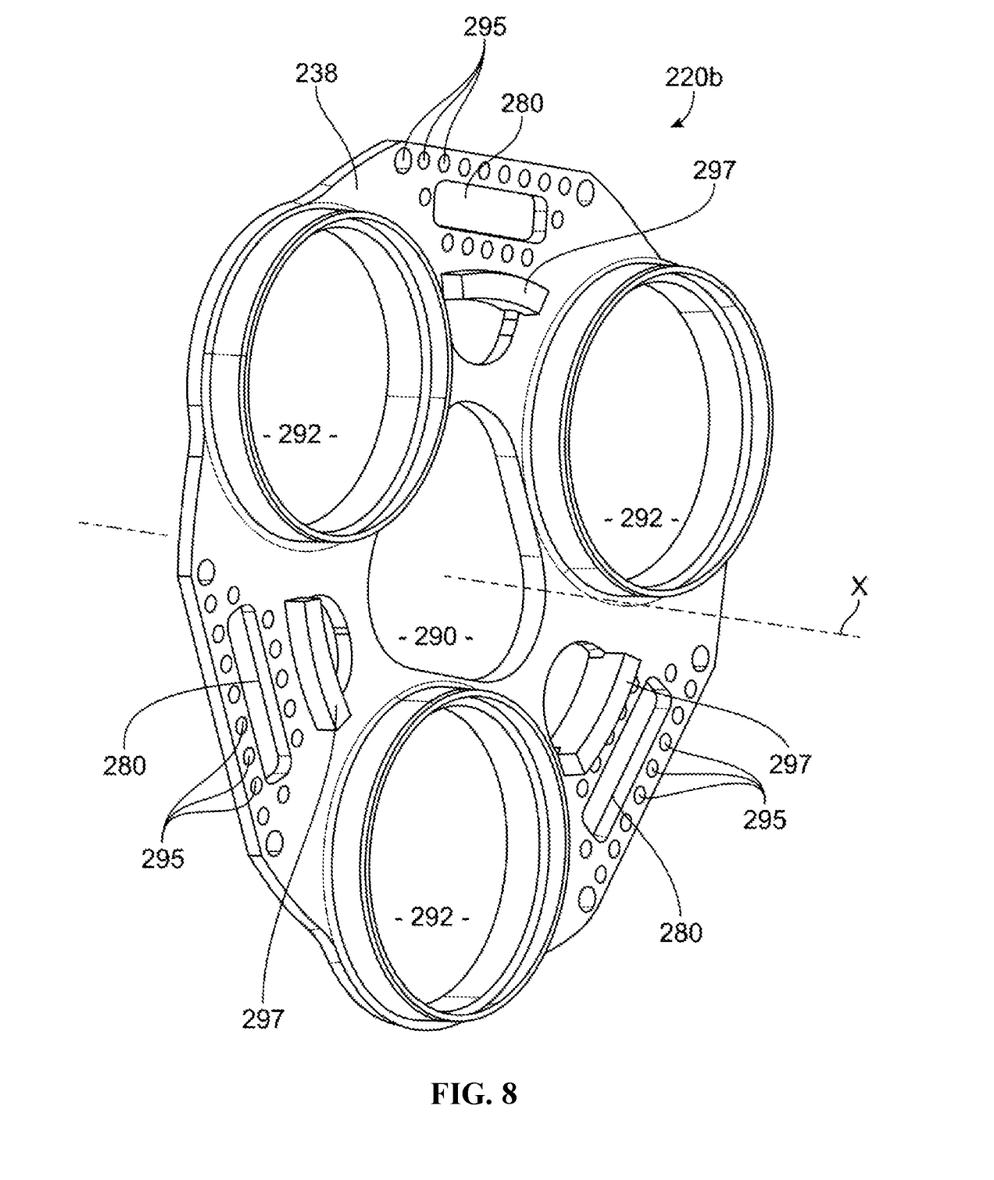
FIG. 8 is a schematic perspective view of one of the parts of a planet carrier in accordance with an alternate embodiment of the present disclosure.
Figure 9:
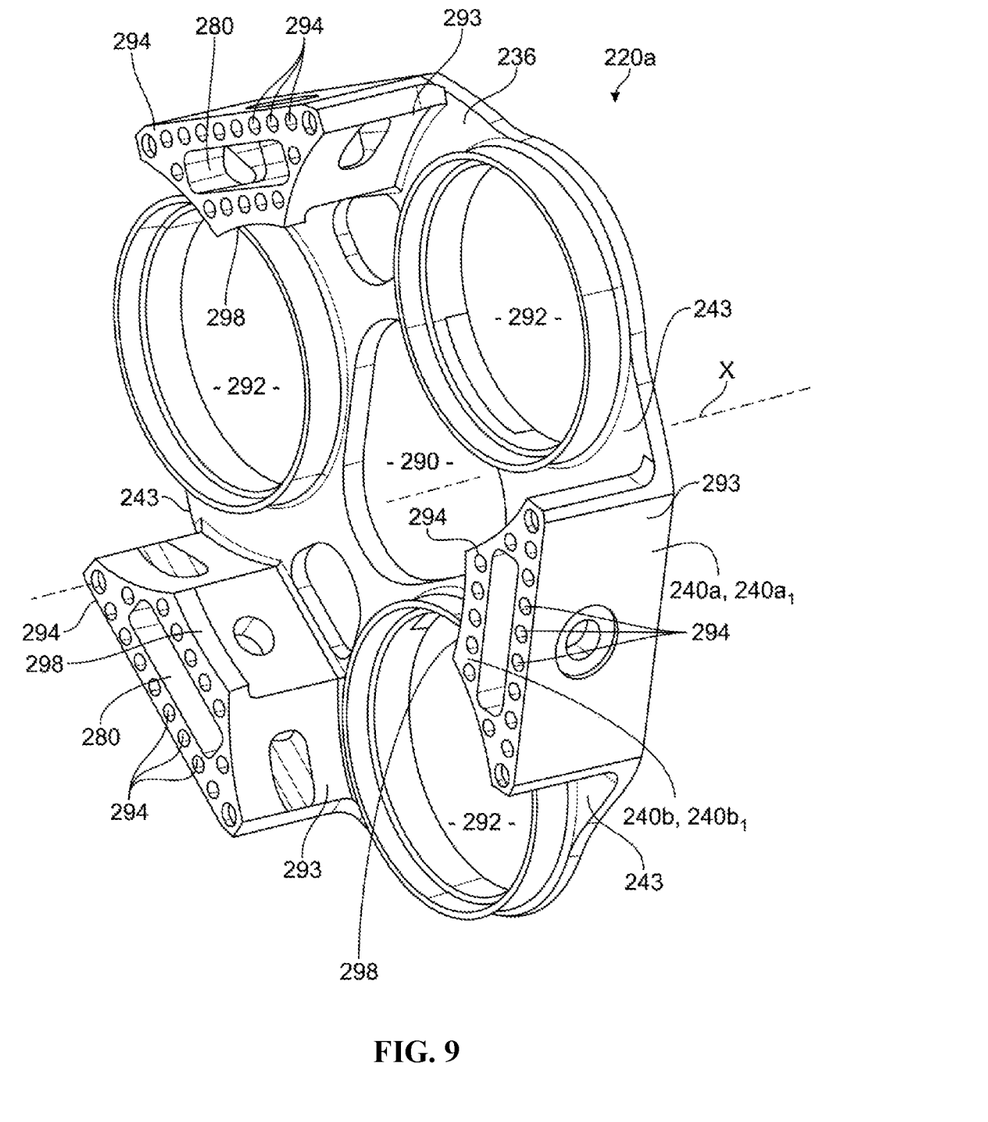
FIG. 9 is a schematic perspective view of the other of the parts of the planet carrier of the alternate embodiment of FIG. 8.

In the alternate embodiment shown in FIGS. 8 and 9, the curved edges 297 are carried by the part 220*b* and project from its face 238*b*.

These edges 297 are intended to cooperate by axial sliding with complementary surfaces 298 of the free ends 294 of the bridges 240*a*1, 240*b*1, and in some embodiments at the level of the radially internal ends of the internal bridges 240*b*1.

In the example shown, each of the edges 297 has an angular extent about the axis X of between 10 and 60°, and in further embodiments between 20 and 40°. Each of the surfaces 298 has an angular extent about the axis X of between 10 and 60°, and in further embodiments between 20 and 40°.

In operation, the curved edges 297 are configured to cooperate by radial support with the curved surfaces 298 to allow, if necessary, a portion of the transmission of forces in the radial direction between the parts 220*a*, 220*b*. Most of these forces are transmitted by means of the screws 299.

In yet another alternate embodiment not shown, centering members can be carried by the two parts 220*a*, 220*b* or at least one of the parts of the cage 220 can comprise two types of edges 297, such as those of the alternate embodiment shown in FIGS. 6 and 7, or the alternate embodiment shown in FIGS. 8 and 9.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A planet carrier for a speed reducer of an aircraft turbomachine, the planet carrier comprising:
- a cage carrier having a main axis, a coupling segment centered on the main axis, and axial cage support fingers distributed around the main axis; and
- a cage centered on the main axis and comprising two radial annular walls connected to each other by bridges distributed around the main axis, the bridges being located at the external periphery of the walls and delimiting with the walls an internal cavity of the cage, the bridges comprising or defining axial housings in which the fingers are mounted, the fingers being connected to the bridges by connections allowing at least one degree of freedom, one of the walls comprising axially through openings which are axially aligned with axially through openings of the other of the walls,
- wherein the cage comprises two parts:
  - a first part comprising one of the walls and the bridges, the bridges projecting axially from a face of this wall and comprising first axial ends connected to this face and second free axial ends; and
  - a second part comprising the other of the walls, the other of the walls comprising a face to which the free ends of the bridges are applied, and
- wherein the two parts of the cage are attached together by attachment means which pass through the wall of the second part and are inserted in attachment holes of the free ends of the bridges.

2. The planet carrier of claim 1, wherein at least one of the parts of the cage comprises centering members configured to cooperate with the other of the parts to ensure a centering of the parts with respect to each other and on the main axis.

3. The planet carrier of claim 2, wherein the centering members comprise curved edges which are carried by one of the parts and which extend around the main axis, wherein the curved edges are configured to cooperate with curved surfaces of the other of the parts.

4. The planet carrier of claim 3, wherein the curved edges are protuberances which project axially.

5. The planet carrier of claim 3, wherein the curved edges are configured to axially engage by sliding with the curved surfaces when the cage is mounted.

6. The planet carrier of claim 3, wherein the curved edges are configured to cooperate by radial abutment with the curved surfaces in operation.

7. The planet carrier of claim 2, wherein the first part comprises the centering members, and wherein the centering members are located on the free ends of the bridges at their radially internal and/or external ends.

8. The planet carrier of claim 2, wherein the second part comprises the centering members, and wherein the centering members are located on the face of the wall of the second part.

9. The planet carrier of claim 1, wherein:
- the free end of each of the bridges comprises a face bearing on the face of the wall of the second part;
- the housing of each bridge opens onto the bearing face; and
- the orifices for attaching the bridges are distributed around the opening of this housing.

10. The planet carrier of claim 1, wherein the wall of the second part comprises axial holes which pass through the wall and are aligned with the housings of the bridges, and wherein the wall of the second part comprises axial orifices through which the attachment means pass and which are distributed around the axial holes.

11. The planet carrier of claim 1, wherein the first part is located on the side of the tubular segment of the cage carrier.

12. The planet carrier of claim 1, wherein the attachment means are screws and the attachment holes are tapped to receive the screws by screwing.

13. A speed reducer for an aircraft turbomachine, the speed reducer having a main axis and comprising:
- a planet carrier according to claim 1;
- a sun gear located in the internal cavity of the cage and centered on the main axis;
- planet gears arranged in the internal cavity around the main axis and the sun gear and meshed with the sun gear, these planet gears being centered and guided by bearings, the axial ends of which are mounted in the aforementioned openings in the walls; and
- a ring gear arranged around the axis and the cage and meshed with the planet gears.

14. A turbomachine for an aircraft, comprising a speed reducer according to claim 13.

15. A planet carrier for a speed reducer of an aircraft turbomachine, the planet carrier comprising:
- a cage carrier having a main axis, a coupling segment centered on the main axis, and axial cage support fingers distributed around the main axis; and
- a cage centered on the main axis and comprising two radial annular walls connected to each other by bridges distributed around the main axis, the bridges being located at the external periphery of the walls and delimiting with the walls an internal cavity of the cage, the bridges comprising or defining axial housings in which the fingers are mounted, the fingers being connected to the bridges by connections allowing at least one degree of freedom, one of the walls comprising axially through openings which are axially aligned with axially through openings of the other of the walls,
- wherein the cage comprises two parts:
  - a first part comprising one of the walls and the bridges, the bridges projecting axially from a face of this wall and comprising first axial ends connected to this face and second free axial ends; and
  - a second part comprising the other of the walls, the other of the walls comprising a face to which the free ends of the bridges are applied,
- wherein the two parts of the cage are attached together by attachment means which pass through the wall of the second part and are inserted in attachment holes in the bridges, and
- wherein:
  - the free end of each of the bridges comprises a face bearing on the face of the wall of the second part;
  - the housing of each bridge opens onto the bearing face; and
  - the orifices for attaching the bridges are distributed around the opening of this housing.

16. A planet carrier for a speed reducer of an aircraft turbomachine, the planet carrier comprising:
- a cage carrier having a main axis, a coupling segment centered on the main axis, and axial cage support fingers distributed around the main axis; and
- a cage centered on the main axis and comprising two radial annular walls connected to each other by bridges distributed around the main axis, the bridges being located at the external periphery of the walls and delimiting with the walls an internal cavity of the cage, the bridges comprising or defining axial housings in which the fingers are mounted, the fingers being connected to the bridges by connections allowing at least one degree of freedom, one of the walls comprising axially through openings which are axially aligned with axially through openings of the other of the walls, wherein the cage comprises two parts:
- a first part comprising one of the walls and the bridges, the bridges projecting axially from a face of this wall and comprising first axial ends connected to this face and second free axial ends; and
- a second part comprising the other of the walls, the other of the walls comprising a face to which the free ends of the bridges are applied, wherein the two parts of the cage are attached together by attachment means which pass through the wall of the second part and are inserted in attachment holes in the bridges, and wherein the wall of the second part comprises axial holes which pass through the wall and are aligned with the housings of the bridges, and wherein the wall of the second part comprises axial orifices through which the attachment means pass and which are distributed around the axial holes.

* * * * *